June 27, 1967    H. M. AUGSBURGER    3,328,153
MEANS FOR CONTROLLING ELECTRIC CURRENTS IN A GLASS FURNACE
Filed Nov. 23, 1962    2 Sheets-Sheet 1

INVENTOR.
HERBERT M. AUGSBURGER
BY J. R. Nelson
and W. A. Schaich
ATTORNEYS

June 27, 1967  H. M. AUGSBURGER  3,328,153
MEANS FOR CONTROLLING ELECTRIC CURRENTS IN A GLASS FURNACE
Filed Nov. 23, 1962  2 Sheets-Sheet 2

INVENTOR.
HERBERT M. AUGSBURGER
BY J. R. Nelson
and W. A. Schaich
ATTORNEYS

United States Patent Office 3,328,153
Patented June 27, 1967

3,328,153
MEANS FOR CONTROLLING ELECTRIC CURRENTS IN A GLASS FURNACE
Herbert M. Augsburger, Sylvania, Ohio, assignor to Owens-Illinois, Inc., a corporation of Ohio
Filed Nov. 23, 1962, Ser. No. 239,594
6 Claims. (Cl. 65—327)

This invention relates generally to glass furnaces provided with Joule effect heating around the point of withdrawal of the glass from the furnace and more particularly to a method and apparatus for short circuiting the electrically heated glass around the point of withdrawal.

In the manufacture of glass, after the raw materials are melted, the molten glass is transferred from the melter portion of the furnace to a refiner portion for temperature and homogenity conditioning. From the refiner, the molten glass is transferred either to a revolving pot or to a feeder forehearth, depending on the type of process desired. The molten glass is then withdrawn from the revolving pot or feeder forehearth in small quantities as gobs or working charges. The quantity of glass making up each gob or charge depends on the product being formed. The charge may be withdrawn either by continuous flow through an orifice whereupon it is severed into gobs by timed reciprocation of shears, or it may be retained in a boot or other enclosure and gathered and withdrawn by a gathering mold through which suction is applied to load the mold with the charge of glass.

While the glass is in the revolving pot or feeder forehearth it is desirable that the temperature be closely controlled. One method of controlling the temperature is to use electric heating. The electric heating is generally obtained by the Joule effect of electric current passing through the glass between electrodes immersed in the glass. When Joule effect heating is utilized, it is necessary to control the electric currents to prevent an electric potential from appearing on the glass that is being removed. The reasons for preventing electric potential from appearing on the glass in this area is that its presence results in defects to the glass, damage to the shears or equipment used to gather the glass, and hazards to the operating personnel.

It is therefore an object of this invention to provide a method and apparatus for preventing the flow of electric current in the glass at the point of withdrawal.

Another object of this invention is to provide grounding electrodes around the point of withdrawal to thereby prevent the flow of electric current in that area.

The specific nature of this invention, as well as other objects and advantages thereof, will become apparent to those skilled in the art, from the following detailed description taken in conjunction with the annexed sheets of drawings on which, by way of preferred example only, are illustrated several embodiments of this invention.

Figure 1:
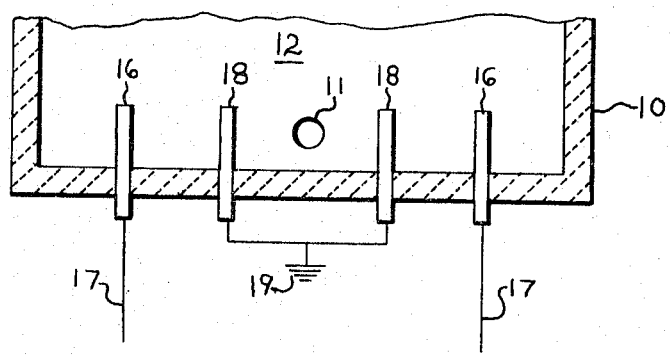
FIGURE 1 is a plan view of the forehearth zone of a glass melting furnace showing ground electrodes and energized electrodes inserted in the end wall of the forehearth in the vicinity of the outlet orifice.
Figure 2:
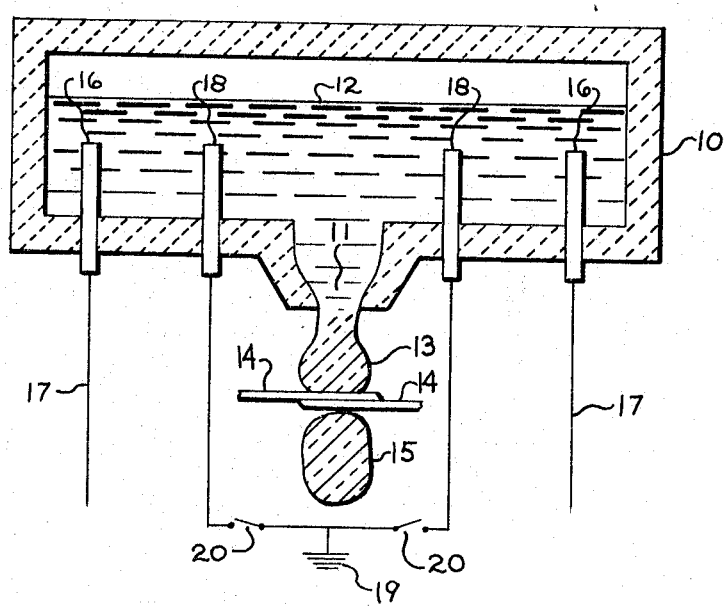
FIGURE 2 is an elevational view partly schematic of a forehearth zone of FIGURE 1 showing the electrodes inserted in the bottom of the forehearth and illustrating a modification of the circuit of FIGURE 1.

Referring now to FIGURES 1 and 2, there is shown a furnace forehearth 10 having a delivery outlet 11 therein. Molten glass 12 is supplied to the furnace forehearth 10 from the melting and refining chambers of a conventional glass melting furnace. The glass melting and refining chambers are well known and are, therefore, not shown on the drawings. The forehearth 10 is so constructed that the molten glass 12 flows through it to delivery outlet 11 by means of gravity. The molten glass 12 is fed in a continuous stream 13 through delivery outlet 11. A pair of reciprocating shears 14 are positioned beneath delivery outlet 11 to sever the continuous stream 13 into working charges or gobs 15. The operation of shears 14 is timed to provide gobs of proper size.

It is desirable to condition the glass while it is retained in the forehearth 10. Such conditioning may be accomplished by further heating obtained by the Joule effect of electric current passing between electrodes immersed in the molten glass 12. Thus in FIGURE 1, a pair of electrodes 16 are inserted in the endwall of the forehearth 10 and are connected to a power circuit 17 containing an energizing source of electric power (not shown). The heat thus applied by the electrodes 16 controls the cooling of the glass and conditions it to the desired working temperature. Naturally, if only energized electrodes are provided, with the delivery outlet 11 located therebetween, there would be an electric potential in the glass flowing through such outlet. This would result in severe arcing when the reciprocating shears 14 contacted such glass.

These harmful electrical currents are eliminated by providing on each side of delivery outlet 11 an electrode 18 connected to a ground 19. The electrodes 18 are positioned so that each one lies between the delivery outlet 11 and one of the energized electrodes 16. With the respective energized and ground electrodes thus positioned, there will be a flow of electric current between the respective energized and ground electrodes on each side of the delivery outlet 11 but not between the two ground electrodes 18. Inasmuch as the spacing between the two ground electrodes 18 is small in comparison to the spacing between the two energized electrodes 16 and since the ground electrodes 18 are located near the central portion of the forehearth where heat losses are the least, the lack of electric heating in the area between the ground electrodes 18 will not greatly impair the desired uniformity in glass temperature.

In FIGURE 2 there is shown a modification wherein the flow of electric current is the same as that previously described for FIGURE 1 during part of the cycle, but during other phases of the cycle the current is permitted to flow the entire distance between the energized electrodes 16, thereby heating the area around the delivery outlet 11 as well as the other areas. This is accomplished by providing a pair of switches 20, one between each electrode 18 and the ground 19. The operation of the switches 20 is so synchronzed that immediately before the reciprocating shears 14 touch the continuous stream 13 of molten glass, the switches 20 are closed to ground out the flow of electric current between electrodes 18 thereby preventing current from reaching the shears. During other phases of the operation when the shears 14 are open and not contacting the glass, the switches 20 are open, thereby permetting the flow of electric current between electrodes 18 as well as the other areas. The electrodes may be installed through the forward end wall of the forehearth as shown in FIGURE 1 or through the bottom wall as shown in FIGURE 2. The switches 20 may be either of the mechanical type or the solid state type such as transistors.

Figure 3:
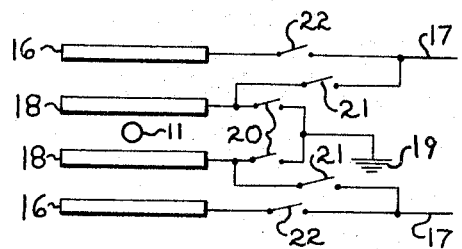
FIGURE 3 is a schematic wiring diagram showing a further modification.

There is shown in FIGURE 3 a further modification wherein means are provided for balancing the heat input throughout the delivery cycle. In this modification, the electrodes 18 are wired for connection alternately to either the ground 19 or the power circuit 17. In addition to the swtiches 20 provided between the ground 19 and the electrodes 18, there are also provided switches 21 between each electrode 18 and the power circuit. Synchronized operation of the switches 20 and 21 permit the electrodes 18 to function alternately as ground electrodes during that part of the cycle when the shears are contacting the glass and as energized electrodes to heat the glass around the delivery outlet during the rest of the cycle. In the preferred embodiment, there may additionally be provided switches 22 between the energized electrodes 16 and the power circuit. Operation of the apparatus of this modification to balance the heat input between the electrodes during the delivery cycle is hereinafter described. When the shearing mechanism is in contact with the glass, switches 21 are open and switches 20 are closed to connect electrodes 18 with the ground 19 to thereby prevent the flow of electric current to the delivery outlet. During this portion of the cycle switches 22 are closed to connect electrodes 16 with the power source. With the switches thus positioned, the glass between each of the energized electrodes 16 and the ground electrode 18 nearest it will be heated, but the glass between the ground electrodes 18 will not. When the shearing mechanism is out of contact with the glass, switches 22 are opened, thereby preventing the flow of electric current to the electrodes 16. During this portion of the cycle, switches 20 are opened and switches 21 are closed to connect electrodes 18 with the power source 17 rather than the ground 19. As a result, during this portion of the cycle the molten glass around the delivery outlet and between electrodes 18 is being heated while the other glass is not. This operation provides an effective method of balancing the heat input over the delivery cycle. If desired, the switches 22 could remain closed during the entire cycle or any portion thereof to provide the desired balance of heat input. However, if the switches 22 are closed during the entire cycle, there will be a non-uinform application of heat.

Figure 4:
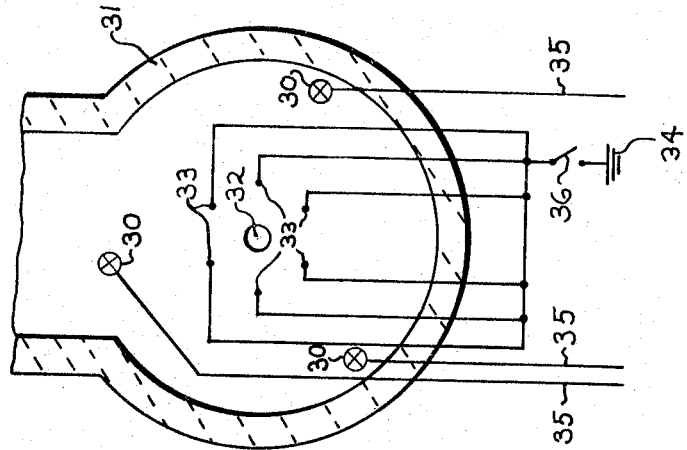
FIGURE 4 is a plan view showing the invention as applied to a body of molten glass heated by a plurality of electrodes energized in a polyphase power circuit.

There is shown in FIGURE 4 another modification adapted for use of polyphase power. There is provided a plurality of electrodes 30, connected to a polyphase power circuit 35 for energization. The energized electrodes 30 are poistioned near the perimeter of a furnace forehearth 31. Although three energized electrodes 30 are shown, a greater number may be provided if desired. A delivery outlet 32 is located intermediate the electrodes 30. With the electrodes 30 thus positioned, the flow of electric current through the molten glass is primarily across the legs of the triangle with currents of lesser potential straying throughout the molten glass. Theoretically, where three electrodes 30 are provided and they are equally spaced, the molten glass lying at the center of the equitareral triangle defined by the electrodes is at zero potential and, if the delivery outlet is at the center, theoreticaly no electric current will flow to said outlet. In actual practice, however, stray currents will flow to the outlet creating the previously noted hazards even though it is positioned at the center of the equilateral triangle. Where a greater number of electrodes 30 is provided or the delivery outlet is not at the center, the hazard of current flowing to the outlet is even greater. To overcome this hazard, a series of second electrodes 33 are positioned to encircle the outlet. Although six electrodes 33 are shown in FIGURE 4, a greater or lesser number may be utilized. The electrodes 33 are connected to a ground 34. By grounding the electrodes 33 surrounding the outlet 32, an effective means of preventing stray currents from reaching said outlet is provided. If desired, a switch 36 may be placed between the ground 34 and the electrodes 33. Where a switch is provided, its operation should be synchronized so that it is closed when the shears are contacting the molten glass to prevent stray currents from reaching the shears. It may be open at other times. Additionally, if desired the electrodes 33 may be wired for alternative connection with a power source during that phase of the cycle when they are out of contact with the ground.

Figure 5:
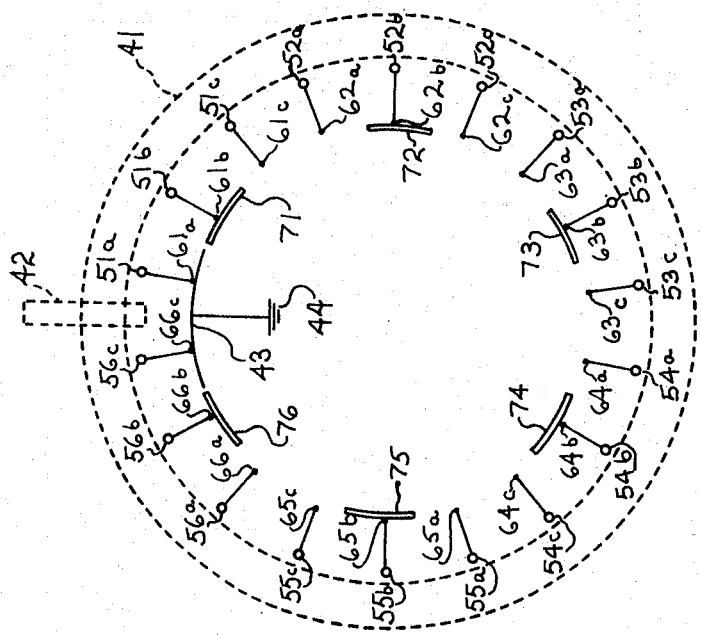
FIGURE 5 is a schematic plan view of another modification wherein the molten charge of glass is removed from a revolving pot by vacuum filling of a mold momentarily in contact with the glass surface.

Another form of the invention is illustrated in FIGURE 5 wherein there is shown schematically a revolving pot 41 from which molten glass is removed near the periphery by means of a ram 42 as is well known in the art. Obviously other types of gathering means or mold filling devices may be used in lieu of the ram 42. A series of eighteen electrodes 51a, b, c, through 56 a, b, c, are positioned in the pot near the periphery. The electrodes revolve with the pot. Each of the electrodes 51a, b, c,–56a, b, c, is connected to a contact 61a, b, c, through 66a, b, c. The contacts are also mounted for rotation with the pot. In addition, six arcuate commutator segments 71 through 76 are positioned for engagement with the contacts. Each of the commutator segments substantially spans the distance between the contacts and is connected to a source of power not shown). The commutator segments remain stationary and are positioned so that each of the commutator segments is simultaneously engaged with one of the revolving contacts 61a, b, c–66a, b, c. Thus, in the phase of the operation illustrated in FIGURE 5, each of the commutator segments 71 through 76 is engaged by one of the contacts denoted with the suffix b. Accordingly, all of the electrodes denoted with the suffix b are energized during this phase. As the pot revolves clockwise, the contacts 61b–66b will pass the ends of, and thereby become disengaged from, their respective commutator segments 71–76 causing electrodes 51b–56b to be deenergized. Substantially simultaneously, each of the contacts 61a–66a will then engage one of commutator segments to thereby energize the electrodes denoted with the suffix a. In a similar manner, the electrodes denoted with suffix c will subsequently be energized.

As may be seen from FIGURE 5, the electrodes between which the ram 42 is positioned, (51a and 56c for the phase of the operation shown in FIGURE 5) are always de-energized. That is to say, neither of the electrodes in that location is ever connected with the power source. Despite this, it is quite probable that unless precautions are taken, stray current will reach the ram 42 when it is dipped into the molten glass. To prevent this, means are provided for grounding the molten glass in the glass gathering or mold filling area. This is accomplished by providing an arcuate commutator segment 43. A ground 44 is connected to the commutator segment 43. The commutator segment 43 is sufficiently long that it is engaged by two contacts (61a and 66c for the phase of the operation shown in FIGURE 5) during that portion of the cycle that the ram 42 is dipped in the molten glass. Engagement of the ground commutator 43 by the two adjacent contacts (61a and 66c in FIGURE 5) causes their respective electrodes (51a and 51c) and hence the molten glass lying therebetween to be grounded thereby preventing any stray currents from reaching the ram 42.

Starting with the positioning of the apparatus as shown in FIGURE 5 and as previously described, one cycle of the ram operation will be described. The ram 42, while immersed, sucks up a gob of molten glass of predetermined size. Upon removal of the ram from the molten glass, the pot 41 is revolved so that the ram, at the next immersion, lies between electrodes 56c and 56b. As a result of the rotation, the contact 66b moves from engagement with the power commutator 76 to engagement with the ground commutator 43. All of the other contacts having the suffix b (61b–65b) also becomes disengaged from their respective power commutators but are then left to stand idle for a period. Accordingly, electrodes 51b–55b also stand idle or de-energized. Contact 61a moves from engagement with the ground commutator 43 to engagement with power commutator 71. Likewise, the other contacts having the suffix a move from an idle position to engagement with one of the power commutators. Accordingly, all electrodes having the suffix *a* become energized. Contact 66c moves along, but retains engagement with, ground commutator 43. Thus, in this position, electrodes 56b and 56c function as grounds to prevent stray currents from reaching the molten glass lying therebetween. The ram 42 is then immersed to suck up another gob of molten glass. In a similar manner, the electrodes having a suffix *c* become energized during the next cycle.

For this form of the invention, it makes no difference whether the pot 41 rotates continuously or intermittently. Likewise, it makes no difference whether the power supplied to the commutators 71–76 is singlephase or polyphase.

It can be easily seen from the foregoing description that this invention provides novel and efficient means for conditioning the molten glass while at the same time effectively controlling the flow of the electric current used in such conditioning.

As used in the appended claims, the term feeder should be understood to include forehearth, revolving pot, or any other structure from which molten glass is removed for subsequent forming. Further, the term delivery zone should be understood to include either the area around an outlet orifice or other area from which molten glass is removed.

It is obvious that numerous modifications will become readily apparent to those skilled in the art. It is not the purpose to limit the scope of the patent granted hereon otherwise than as necessitated by the scope of the appended claims.

I claim:

1. In a feeder forehearth for a glass melting furnace having a delivery outlet therein, said forehearth connected at one end to a body of refined glass and receiving said glass therefrom and discharging it at said delivery outlet, the combination of electric heating means comprising a pair of first electrodes submerged in the glass in said forehearth, an electric power source, a single phase of a power circuit of said source connected across said first pair of electrodes for heating said glass by Joule effects of electric current passed therethrough between said electrodes, said electrodes so positioned that the delivery outlet lines therebetween; a second pair of electrodes submerged in said glass and positioned between the first pair of electrodes so that the delivery outlet lies between said second pair of electrodes, and means responsive to the cyclic operation of glass working means for alternately connecting said second pair of electrodes to ground, whereby said second pair of electrodes are alternately grounded and ungrounded.

2. Apparatus of controlling the flow of electric current throughout molten glass in a revolving pot feeder wherein charges of molten glass are removed by gathering means near the perimeter of the pot, said apparatus comprising a source of electric power, a plurality spaced-apart, stationary commutators connected to said power source, at least three times as many equally spaced apart electrodes as commutators, said electrodes immersed in the molten glass near the periphery of and movable with the pot, a contact connected to each of said electrodes said contacts being positioned for successive engagement by each commutator, the spacing between each adjacent pair of commutators being sufficient for two non-engaged contacts, a grounded commutator positioned between one adjacent pair of commutators, said grounded commutator having sufficient circumferential length to engage two said contacts thereby grounding two adjacent electrodes as said pot revolves, and gathering means positioned to remove glass from the zone between said adjacent grounded electrodes.

3. In a feeder forehearth for a glass melting furnace having a delivery outlet therein, said forehearth connected at one end to a body of refined glass and receiving said glass therefrom and discharging it at said delivery outlet to glass working means, the combination of electric means comprising an electric power source, a set of first electrodes connected to said power source and submerged in the glass in said forehearth for heating said glass by Joule effect of electric current passed therethrough between said electrodes, said electrodes so positioned that the delivery outlet lies therebetween, a second set of electrodes submerged in said glass and positioned so that each of said second electrodes lies between one of the first electrodes and the delivery outlet, and switching means responsive to glass working means to connect the second electrodes to the ground when the working means are in contact with the refined glass and are ungrounded when the working means are out of contact with the glass.

4. The combination defined in claim 3 further including means for connecting said second electrodes with said power source when said second electrodes are ungrounded.

5. The combination defined in claim 4 further including means for disconnecting said first electrodes from said power source when the second electrodes are connected to the power source.

6. In a feeder forehearth for a glass melting furnace having a delivery outlet therein, said forhearth connected at one end to a body of refined glass and receiving said glass therefrom and discharging it at said delivery outlet to glass working means, the combination of electric heating means comprising at least three first electrodes positioned in said forehearth, said electrodes being located so that the delivery outlet lies with a polygon formed by drawing a straight line between adjacent electrodes, a polyphase electric power source, means connecting said first electrodes with the power source, at least three second electrodes connected to ground surrounding the delivery outlet and lying within said polygon, and switching means responsive to glass working means to connect the second electrodes to the ground when the working means are in contact with the refined glass and are ungrounded when the working means are out of contact with the glass.

References Cited

UNITED STATES PATENTS

| | | |
|---|---|---|
| 2,428,969 | 10/1947 | Guyer. |
| 2,919,297 | 12/1959 | Augsburger _____ 13—6 |
| 2,993,079 | 7/1961 | Augsburger _____ 13—6 |
| 3,078,695 | 2/1963 | Kozak _____65—327 X |

DONALD H. SYLVESTER, *Primary Examiner.*

D. CRUPAIN, G. R. MYERS, *Assistant Examiners.*